(12) United States Patent
Murata et al.

(10) Patent No.: US 9,385,405 B2
(45) Date of Patent: Jul. 5, 2016

(54) POWER STORAGE DEVICE AND BATTERY TEMPERATURE REGULATING METHOD

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Takashi Murata, Kasugai (JP); Yasumitsu Omi, Okazaki (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 116 days.

(21) Appl. No.: 14/360,547

(22) PCT Filed: Nov. 20, 2012

(86) PCT No.: PCT/IB2012/002394
§ 371 (c)(1),
(2) Date: May 23, 2014

(87) PCT Pub. No.: WO2013/076546
PCT Pub. Date: May 30, 2013

(65) Prior Publication Data
US 2014/0287281 A1    Sep. 25, 2014

(30) Foreign Application Priority Data

Nov. 25, 2011  (JP) .................................. 2011-256984

(51) Int. Cl.
*H01M 10/50*   (2006.01)
*H01M 10/63*   (2014.01)
*H01M 2/10*    (2006.01)
(Continued)

(52) U.S. Cl.
CPC .......... *H01M 10/502* (2013.01); *H01M 2/1077* (2013.01); *H01M 10/5016* (2013.01); *H01M 10/613* (2015.04); *H01M 10/625* (2015.04); *H01M 10/63* (2015.04); *H01M 10/633* (2015.04); *H01M 10/635* (2015.04); *H01M 10/6563* (2015.04); *H01M 10/486* (2013.01);
(Continued)

(58) Field of Classification Search
CPC .......... H01M 10/486; H01M 10/5016; H01M 10/502; H01M 10/613; H01M 10/617; H01M 10/625; H01M 10/63; H01M 10/633; H01M 10/635; H01M 10/6563; H01M 10/658; H01M 2/1077
See application file for complete search history.

(56) References Cited

U.S. PATENT DOCUMENTS

| | | | |
|---|---|---|---|
| 4,913,985 A | 4/1990 | Baer | |
| 5,490,572 A * | 2/1996 | Tajiri | B60H 1/00278 180/65.1 |

FOREIGN PATENT DOCUMENTS

| | | |
|---|---|---|
| JP | 07-226229 A | 8/1995 |
| JP | 11-178115 A | 7/1999 |
| JP | 2011159601 A | 8/2011 |

*Primary Examiner* — Patrick Ryan
*Assistant Examiner* — Ben Lewis
(74) *Attorney, Agent, or Firm* — Kenyon & Kenyon LLP

(57) ABSTRACT

A power storage device includes a case in which at least one unit cell is housed; a heat exchanger (31) that is provided in a wall surface of the case so as to face both an inside of the case and an outside of the case, and that performs heat exchange between the inside of the case and the outside of the case; and a plurality of dividing members (21, 22) that are arranged in an up-down direction inside the case so as to be opened and closed independently of one another, and that divide a space inside the case into a space in which the at least one unit cell is housed and a space in which the heat exchanger is arranged.

11 Claims, 10 Drawing Sheets

(51) Int. Cl.
*H01M 10/625* (2014.01)
*H01M 10/633* (2014.01)
*H01M 10/6563* (2014.01)
*H01M 10/635* (2014.01)
*H01M 10/613* (2014.01)
*H01M 10/48* (2006.01)
*H01M 10/617* (2014.01)
*H01M 10/658* (2014.01)

(52) U.S. Cl.
CPC ........... *H01M 10/617* (2015.04); *H01M 10/658* (2015.04)

FIG. 5A

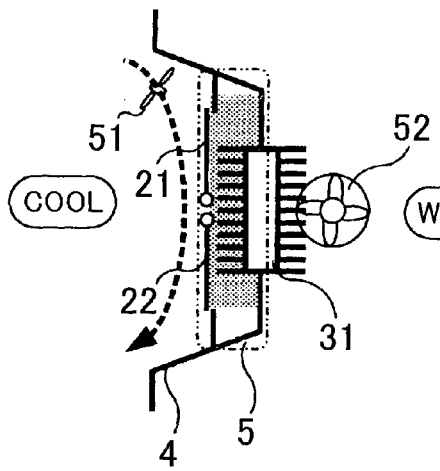

CASE INTERNAL TEMPERATURE IS HIGH, AND CASE INTERNAL TEMPERATURE < OUTSIDE AIR TEMPERATURE (WANT TO KEEP INSIDE OF CASE COOL)

FIG. 5B

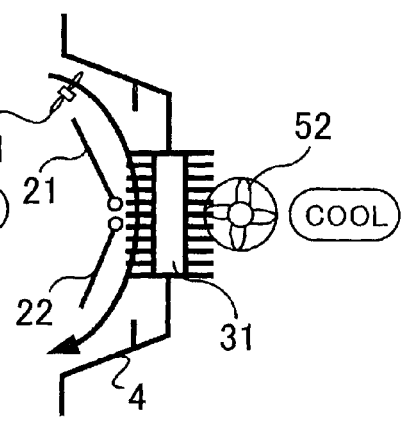

CASE INTERNAL TEMPERATURE IS HIGH, AND CASE INTERNAL TEMPERATURE > OUTSIDE AIR TEMPERATURE (WANT TO COOL INSIDE OF CASE)

FIG. 5C

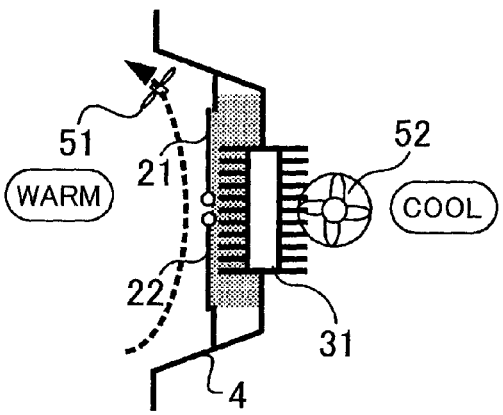

CASE INTERNAL TEMPERATURE IS LOW, AND CASE INTERNAL TEMPERATURE > OUTSIDE AIR TEMPERATURE (WANT TO KEEP INSIDE OF CASE WARM)

FIG. 5D

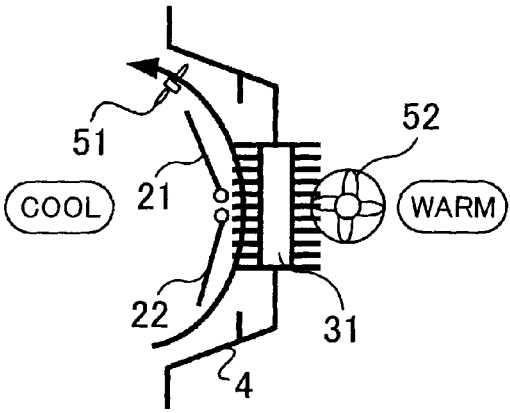

CASE INTERNAL TEMPERATURE IS LOW, AND CASE INTERNAL TEMPERATURE < OUTSIDE AIR TEMPERATURE (WANT TO WARM INSIDE OF CASE)

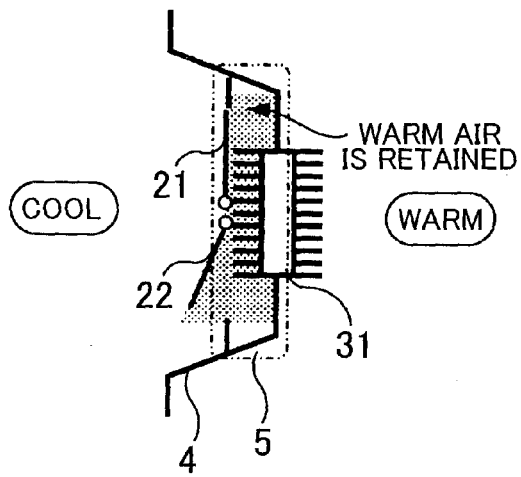

FIG. 6A

AMBIENT AIR TEMPERATURE IS HIGH, AND CASE INTERNAL TEMPERATURE < OUTSIDE AIR TEMPERATURE (WANT TO KEEP INSIDE OF CASE COOL)

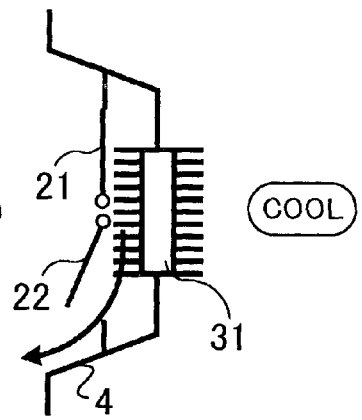

FIG. 6B

AMBIENT AIR TEMPERATURE IS HIGH, AND CASE INTERNAL TEMPERATURE > OUTSIDE AIR TEMPERATURE (WANT TO COOL INSIDE OF CASE)

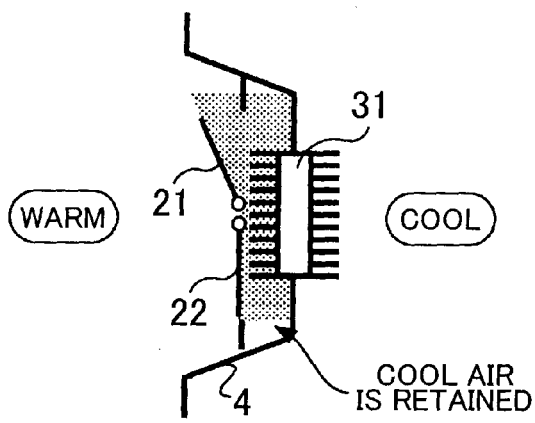

FIG. 6C

AMBIENT AIR TEMPERATURE IS LOW, AND CASE INTERNAL TEMPERATURE > OUTSIDE AIR TEMPERATURE (WANT TO KEEP INSIDE OF CASE WARM)

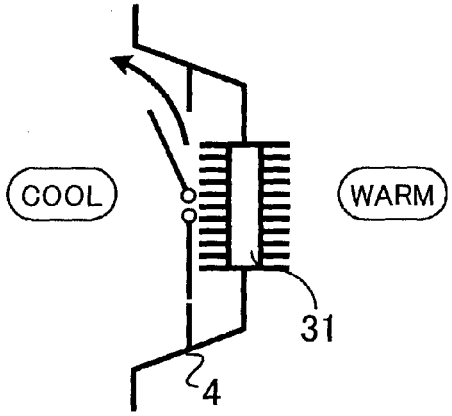

FIG. 6D

AMBIENT AIR TEMPERATURE IS LOW, AND CASE INTERNAL TEMPERATURE < OUTSIDE AIR TEMPERATURE (WANT TO WARM INSIDE OF CASE)

POWER STORAGE DEVICE AND BATTERY TEMPERATURE REGULATING METHOD

CROSS-REFERENCE TO RELATED APPLICATIONS

This is a national phase application based on the PCT International Patent Application No. PCT/IB2012/002394 filed on Nov. 20, 2012, and Japanese Patent Application No. 2011-256984 filed on Nov. 25, 2011, the entire contents of which are incorporated herein by reference.

BACKGROUND OF THE INVENTION

1. Field of the Invention

The invention relates to technology for regulating the temperature inside of a power storage device.

2. Description of the Related Art

In recent years, electric vehicles and hybrid vehicles and the like that are provided with an electric motor for driving the vehicle have been receiving attention as environmentally friendly vehicles. The electric motor is driven by electric power output from a battery having a plurality of unit cells that are rechargeable.

Also, with a battery such as a lithium-ion battery, the original energy of the battery is unable to be output in a low-temperature environment. On the other hand, in a high-temperature environment, the battery life becomes shorter. Therefore, the battery is preferably maintained at a temperature of approximately 10° C. to 40° C.

As technology related to this kind of temperature regulation, Japanese Patent Application Publication No. 7-226229 (JP 7-226229 A) describes a high-temperature battery insulating container. In this high-temperature insulating container, when the high-temperature battery generates heat, a thermal insulation panel is raised by a cylinder device and the insulation thickness of a ceiling portion of a vacuum insulation wall is decreased to reduce the insulation performance of the insulating container and promote the dissipation of heat. The heat dissipated from the insulation wall is converted into electricity using a thermoelectric power generating element that is mounted to the vacuum insulation wall, and the energy produced using this wasted heat is used to activate the cylinder device at this time.

In order to regulate the temperature as described above, when simply using heat insulating material, in summer, the temperature inside a battery case does not easily become high but is difficult to cool, so the temperature inside the battery case is often higher than the outside air temperature. On the other hand, in winter, the temperature inside the battery case does not easily become low and does not easily become high due to the heat insulating material, so the temperature inside the battery case is often lower than the outside air temperature.

Also, throughout the day, a vehicle is generally left stopped for a longer time period than a time period in which the vehicle is kept running. Regulation of the battery temperature must be considered even when the vehicle is left stopped or the battery is in long-term storage. However, with JP 7-226229 A, electric power needs to be supplied, making it difficult to deal with situations in which the vehicle is left stopped or the battery is in long-term storage.

SUMMARY OF THE INVENTION

The invention thus provides a power storage device having a structure in which temperature regulation is possible even while a vehicle is left stopped or the power storage device is stored for a long term.

A first aspect of the invention relates to a power storage device that includes a case in which at least one unit cell is housed; a heat exchanger that is provided in a wall surface of the case so as to face both an inside of the case and an outside of the case, and that performs heat exchange between the inside of the case and the outside of the case; and a plurality of dividing members that are arranged in an up-down direction inside the case so as to be opened and closed independently of one another, and that divide a space inside the case into a space in which the at least one unit cell is housed and a space in which the heat exchanger is arranged. The space inside the case is divided by the plurality of dividing members such that airflow is at least hindered, i.e., the space in which the at least one unit cell is housed and the space in which the heat exchanger is arranged do not necessarily need to be sealed completely. Also, taking into account a situation in which the dividing members are unable to be opened and closed by electric power, such as when the power storage device is stored for a long term, the plurality of dividing members may also be able to be opened and closed by a manual operation from the outside of the case.

Also, in the above-described aspect, the plurality of dividing members may include an upper dividing member that is arranged at an uppermost position among the plurality of dividing members and pivots about a lower end portion serving as a fulcrum, and a lower dividing member that is arranged at a lowermost position among the plurality of dividing members and pivots about an upper end portion serving as a fulcrum. With this structure, the dividing member located at the uppermost position and the dividing member located at the lowermost position pivot about the fulcrums, so when the dividing members are open, the dividing members are substantially parallel to the flow direction of thermal convection, and thus tend not to hinder thermal convection between the space in which the heat exchanger is arranged and the space in which the at least one unit cell is housed.

Also, in the above-described aspect, an opening formed by the upper dividing member when the upper dividing member is open may be positioned higher than the heat exchanger, and an opening formed by the lower dividing member when the lower dividing member is open may be positioned lower than the heat exchanger.

In the above-described aspect, each of the plurality of dividing members may be parallel to the up-down direction when the plurality of dividing members are closed such that the space inside the case is divided into the space in which the at least one unit cell is housed and the space in which the heat exchanger is arranged.

The power storage device according to the above-described aspect may further include a fan that is positioned in the space in which the at least one unit cell is housed when the plurality of dividing members are closed such that the space in which the at least one unit cell is housed is divided from the space in which the heat exchanger is arranged by the plurality of dividing members. Providing the fan at the position described above makes it possible to promote a circulating flow inside the case. Also, by arranging the fan in the space in which the at least one unit cell is housed, when there is a large temperature variation among unit cells, for example, it is possible to forcibly create a circulating flow only inside the case, without performing heat exchange with the outside air, in order to avoid a situation where the temperature variation increases as a result of the unit cells near the heat exchanger being further warmed or cooled excessively.

In the above-described aspect, the heat exchanger may be provided on a side surface of the case, and the fulcrum of the upper dividing member and the fulcrum of the lower dividing member may be positioned near a center of the heat exchanger in the up-down direction.

The power storage device according to the above-described aspect may further include an external fan that is provided outside the case and blows air toward a side of the heat exchanger, the side facing the outside of the case.

Also, a second aspect of the invention relates to a battery temperature regulating method for a power storage device that includes a case in which at least one unit cell is housed, a heat exchanger that is provided in a wall surface of the case so as to face both an inside of the case and an outside of the case, and that performs heat exchange between the inside of the case and the outside of the case, a plurality of dividing members that are arranged in an up-down direction inside the case so as to be opened and closed independently of one another, and that divide a space inside the case into a space in which the at least one unit cell is housed and a space in which the heat exchanger is arranged, and a driving portion that drives the plurality of dividing members independently of one another. The battery temperature regulating method includes detecting an air temperature outside the case that is a temperature of air to which the heat exchanger is exposed; detecting an air temperature inside the case; and performing drive control to pivot at least one of the plurality of dividing members based on the detected air temperature outside the case and the detected air temperature inside the case. Naturally, either detection of the air temperature outside the case or detection of the air temperature inside the case may be performed first. The order of detection does not matter as long as both temperature detections have been completed as a result when making a determination regarding the pivot directions of the dividing members.

In the above-described aspect, the plurality of dividing members may include an upper dividing member that is arranged at an uppermost position among the plurality of dividing members and pivots about a lower end portion serving as a fulcrum, and a lower dividing member that is arranged at a lowermost position among the plurality of dividing members and pivots about an upper end portion serving as a fulcrum; and in a case where a supply of electric power to the driving portion is available, driving control may be performed such that both the upper dividing member and the lower dividing member are either open or closed, and in a case where the supply of electric power to the driving portion is to become unavailable, the driving control may be performed such that one of the upper dividing member and the lower dividing member is open or closed before the supply of electric power to the driving portion becomes unavailable.

In the above-described aspect, the power storage device may further include a fan arranged inside the case; and the battery temperature regulating method may further include driving the fan so that the fan rotates in a rotational direction that creates a downward airflow near the heat exchanger if the detected air temperature inside the case is equal to or higher than a first threshold value, and driving the fan so that the fan rotates in a rotational direction that creates an upward airflow near the heat exchanger if the detected air temperature inside the case is equal to or lower than a second threshold value that is smaller than the first threshold value. Thus, when the temperature inside the case becomes high, such as in summer, a downward airflow is created to promote the intake of cool air, and when the temperature inside the case becomes low, such as in winter, an upward airflow is created to promote the intake of warm air. As a result, the inside of the case is able to be efficiently cooled and heated.

In the above-described aspect, the plurality of dividing members may include an upper dividing member that is arranged at an uppermost position among the plurality of dividing members and pivots about a lower end portion serving as a fulcrum, and a lower dividing member that is arranged at a lowermost position among the plurality of dividing members and pivots about an upper end portion serving as a fulcrum; and in a case where a supply of electric power to the driving portion is to become unavailable, driving control may be performed such that the upper dividing member is closed and the lower dividing member is open before the supply of electric power to the driving portion becomes unavailable if the detected air temperature outside the case is equal to or higher than a third threshold value, and the driving control may be performed such that the upper dividing member is open and the lower dividing member is closed before the supply of electric power to the driving portion becomes unavailable if the detected air temperature outside the case is lower than the third threshold value. Thus, even when the vehicle is left, the inside of the case is able to be efficiently kept warm, heated, kept cool, and cooled.

According to the above-described aspects, it is possible to regulate the temperature inside the case in which the at least one unit cell is housed, and provide the structure in which temperature regulation inside the case is possible even when the supply of electrical energy or the like is unavailable.

BRIEF DESCRIPTION OF THE DRAWINGS

The features, advantages, and technical and industrial significance of this invention will be described in the following detailed description of embodiments of the invention with reference to the accompanying drawings, in which like numerals denote like elements, and wherein:

FIGS. 5A to 5D are views of open and closed states of the dividing members in each temperature condition when a fan is able to be driven (i.e., when a supply of electric power is available), in the embodiment;

FIGS. 6A to 6D are views of open and closed states of the dividing members in each temperature condition when a supply of electric power is unavailable, in the embodiment;

DETAILED DESCRIPTION OF EMBODIMENTS

Figure 1A:
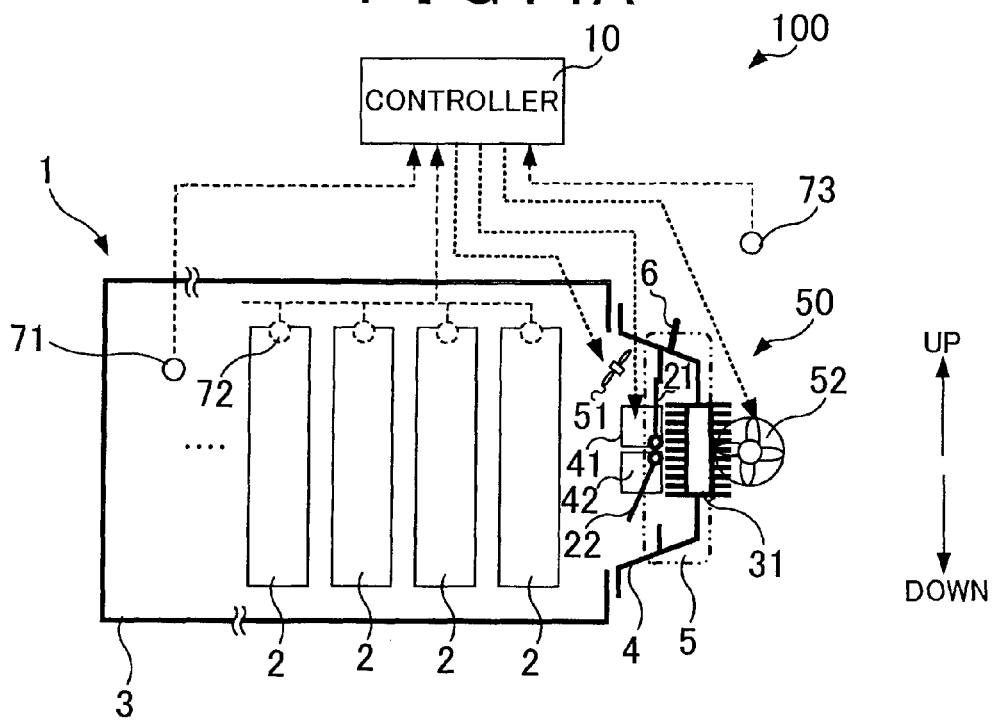
FIGS. 1A and 1B are views of a power storage device cooling system and a power storage device according to an embodiment of the invention.

The general structure of a power storage device cooling system according to an embodiment of the invention will be described with reference to FIG. 1A. The power storage device cooling system 100 includes a power storage device 1, a controller 10, and an outside air temperature sensor 73, and is mounted in a vehicle. The broken arrows between the controller 10 and the power storage device 1 and the broken arrow between the controller 10 and the outside air temperature sensor 73 indicate the direction of control, i.e., the direction in which data is sent.

First the internal structure of the power storage device 1 will be described. The power storage device 1 includes a plurality of unit cells 2, a battery case 3 in which the unit cells 2 are housed, and a temperature control unit 50 that is mounted in an opening of the battery case 3. The battery case 3 and a temperature control unit case 4 are joined to form a single case. In the battery case 3, a heat-insulating layer of urethane foam is provided inside a resin or metal exterior. Heat insulating material formed by resin and urethane foam is used in the temperature control unit case 4.

Each of the unit cells 2 may be formed by a single battery cell or by a plurality of battery cells connected together. A battery cell is a rechargeable element as the smallest unit. Each of the unit cells 2 has a battery temperature sensor 72. The battery temperature sensor 72 obtains information relating to the temperature of the unit cell 2 and outputs the obtained information to the controller 10. The information relating to the temperature may be a resistance value of a thermistor. In this case, the controller 10 calculates the temperature of the unit cell 2 from a change in the resistance value of the thermistor.

Also, a case internal temperature sensor 71 that measures the temperature inside the case is housed in the battery case 3. The case internal temperature sensor 71 obtains information relating to the temperature inside the battery case 3 and outputs the obtained information to the controller 10. A circulating flow is created by an internal circulating fan 51, in an internal space that is formed by the battery case 3 and the temperature control unit case 4. Temperature variation among the unit cells 2 is reduced by this circulating flow. The internal circulating fan 51 is driven in response to receiving a control signal from the controller 10, and is able to not only rotate in one direction, but also rotate in the reverse direction according to the control signal. In this embodiment, the internal circulating fan 51 is inclined such that a rotational axis of the internal circulating fan 51 points upward inside the temperature control unit case 4. As a result, a circulating flow is created not only inside the battery case 3, but also inside the temperature control unit case 4.

The temperature control unit 50 includes two members, i.e., an upper dividing member 21 and a lower dividing member 22. Each of the upper dividing member 21 and the lower dividing member 22 pivots about a fulcrum, so that a portion of the space inside the temperature control unit case 4 (i.e., the space denoted by the alternate long and two short dashes line in FIGS. 1A and 1B) becomes a closed space or an open space (in other words, the upper dividing member 21 and the lower dividing member 22 serve as a partition). In this example, this portion of the space will be referred to as an air chamber 5 when necessary. The rotating operation of the upper dividing member 21 is controlled by an actuator 41 that is a driving portion, according to a control signal output from the controller 10. The rotating operation of the lower dividing member 22 is controlled by an actuator 42 that is a driving portion, according to a control signal output from the controller 10. Also, the upper dividing member 21 is positioned on an upper side (i.e., an upper position) inside the temperature control unit case 4, and pivots about a lower end portion serving as the fulcrum, such that the upper side opens. Also, the lower dividing member 22 is positioned on a lower side (i.e., a lower position) inside the temperature control unit case 4, and pivots about an upper end portion serving as the fulcrum, such that the lower side opens. Further, a longitudinal direction of each of the upper dividing member 21 and the lower dividing member 22 when the dividing member is open, is substantially parallel to the flow direction of the circulating flow, so as not to hinder the circulating flow.

Also, the temperature control unit 50 includes an aluminum heat exchange fin unit 31 (i.e., a heat exchanger) that is able to perform heat exchange between the outside air and the air inside the case, in an outside wall of the temperature control unit case 4. The heat exchange fin unit 31 is provided on a side surface of the temperature control unit case 4 so as to face both the inside of the power storage device 1 and the outside of the power storage device 1, and performs heat exchange between the inside of the power storage device 1 and the outside of the power storage device 1. The heat exchange fin unit 31 is configured such that a plurality of rod-shaped or plate-shaped fins protrude toward the inside and outside of the case in order to increase the heat receiving area. An external fan 52 that blows air toward the heat exchange fin unit 31 is provided on the outside air side of the heat exchange fin unit 31. The external fan 52 operates based on a control signal from the controller 10.

When the upper dividing member 21 is open (i.e., in an open position), the height position of the thus formed opening is higher than the heat exchange fin unit 31, and when the lower dividing member 22 is open, the height position of the thus formed opening is lower than the heat exchange fin unit 31. Also, when the upper dividing member 21 and the lower dividing member 22 are both closed (i.e., in a closed position), they are parallel to an up-down direction. The fulcrums of the upper dividing member 21 and the lower dividing member 22 are positioned near the center of the heat exchange fin unit 31 in the up-down direction. When the upper dividing member 21 and the lower dividing member 22 are closed, the space in which the unit cells 2 are housed is divided from the space in which the heat exchange fin unit 31 is arranged, and the internal circulating fan 51 is positioned in the space in which the unit cells 2 are housed.

The outside air temperature sensor 73 obtains information relating to the temperature outside the vehicle, and outputs this obtained information to the controller 10. The information relating to the temperature may be a resistance value of a thermistor. In this case, the controller 10 calculates the temperature outside the vehicle from a change in the resistance value of the thermistor. Here, the outside air temperature sensor 73 is arranged on a lower front portion of an outside wall of the vehicle.

The controller 10 is an Engine Control Unit (ECU) and performs various controls of the vehicle. The controller 10 may include a CPU or an MPU, or it may include an ASIC circuit that executes at least a portion of processing performed in the CPU or the like. Also, there may be only one CPU or the like, or there may be a plurality of CPUs or the like.

When the vehicle is running, the actuator 41, the internal circulating fan 51, and the external fan 52 may be supplied with electric power from the power storage device 1, or from an auxiliary battery, not shown.

Figure 1B:
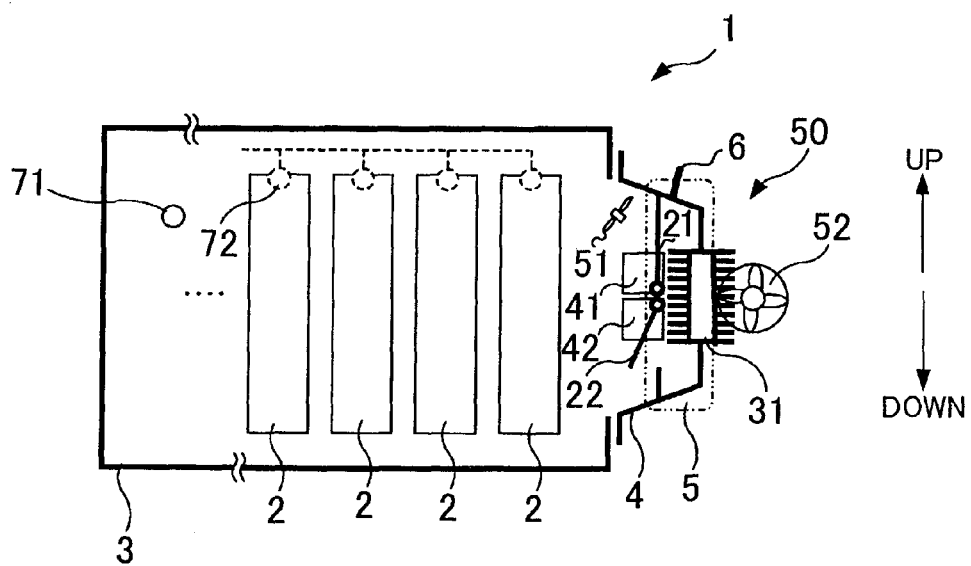

In FIG. 1A, the power storage device 1 is shown in a state in which it is mounted in a vehicle and connected to the controller 10 and the like, while in FIG. 1B, the power storage device 1 is shown alone in a state before being shipped or when being stored or the like. Also, in this embodiment, before being shipped or when being stored, the power storage device 1 is arranged such that the upper side and lower side of the power storage device 1 (i.e., the up-down orientation) are the same as those when the power storage device 1 is mounted in a vehicle. Before being shipped or when being stored, power is not supplied to the power storage device 1, so the actuator 41, the internal circulating fan 51, and the external fan 52 do not operate. Also, a switch 6 for manually controlling the open/closed states of the upper dividing member 21 and the lower dividing member 22 is provided on an upper portion of the outside wall of the temperature control unit case 4. This switch 6 will be described later.

Figure 2:
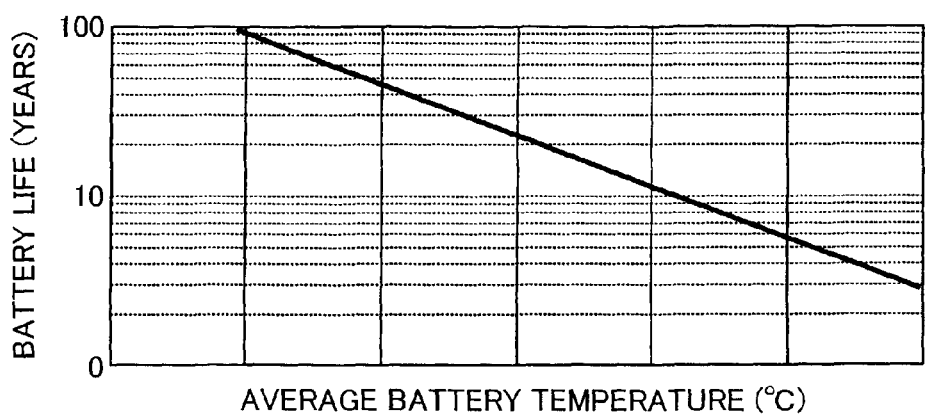
FIG. 2 is a graph showing an example of the characteristics of battery temperature and battery life.

Here, the necessity and outline of the temperature regulation of this embodiment now be described with reference to FIGS. 2 and 3. First, FIG. 2 is a graph showing an example of battery temperature and battery life of a unit cell. The life of a unit cell decreases as the average temperature increases, and the life of the unit cell increases as the average temperature decreases. However, when the unit cell is at a low temperature such as below 5° C., for example, the energy supply output decreases.

Figure 3:
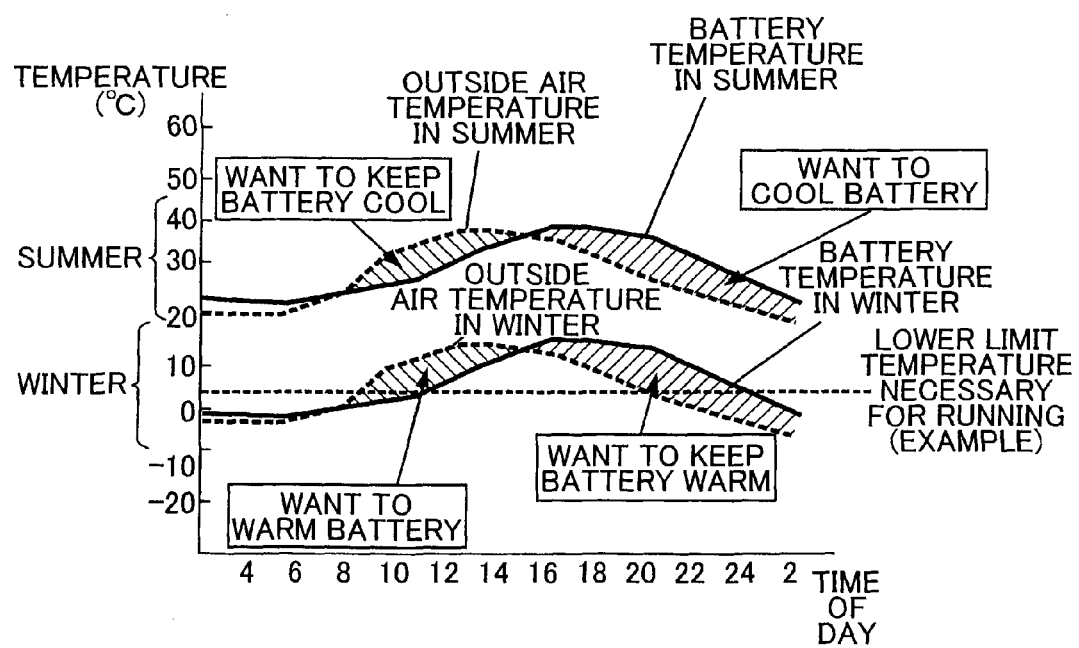
FIG. 3 is a graph showing the relationship between battery temperature and outside air temperature in winter and summer.

FIG. 3 is a graph showing examples of changes in the outside air temperature and the battery temperature when the vehicle is left over the course of a day (24 hours) in summer and in winter. Normally, the outside air temperature that has cooled during the night rises from the morning through the afternoon, and then falls in the evening. Meanwhile, the battery temperature rises and falls with the outside air temperature, but there is a time lag until it is affected by the outside air temperature. As a result, during the day the outside air temperature is higher than the battery temperature, but in the evening this temperature difference reverses and the battery temperature becomes higher than the outside air temperature.

Also, in summer the ambient air temperature rises, so it is better that the battery temperature be relatively lower than the ambient air temperature. Therefore, when the battery temperature is lower than the outside air temperature, the battery should be insulated from the outside air to keep the battery cool. Conversely, when the battery temperature is higher than the outside air temperature, it is desirable to take in cool air to cool the battery.

On the other hand, in winter the ambient air temperature falls, so it is better that the battery temperature be relatively higher than the ambient air temperature. Therefore, when the battery temperature is lower than the outside air temperature, it is desirable to take in warm air to warm the battery, and when the battery temperature is higher than the outside air temperature, the battery should be insulated to keep the battery warm.

In this embodiment, the temperature of the battery is controlled so as not to become too warm or too cool by controlling insulation from the outside air, and heat exchange with the outside air (hereinafter this control will be referred to simply as "insulation/heat exchange control"). That is, the controller 10 controls insulation from the outside air, and heat exchange with the outside air via the heat exchange fin unit 31, by controlling the open/closed states of the upper dividing member 21 and the lower dividing member 22. Also, heat exchange between the outside air and the inside of the temperature control unit case 4 (i.e., the air chamber 5) is made more efficient by driving the external fan 52, and heat exchange between the inside of the temperature control unit case 4 and the inside of the battery case 3 is made more efficient by driving the internal circulating fan 51.

Figure 4A:
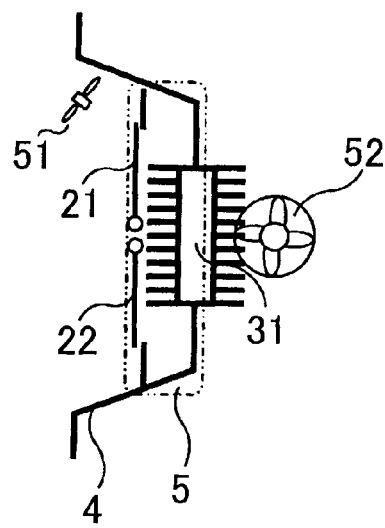
FIGS. 4A to 4D are views of open and closed patterns of an upper dividing member and a lower dividing member in the embodiment.
Figure 4B:
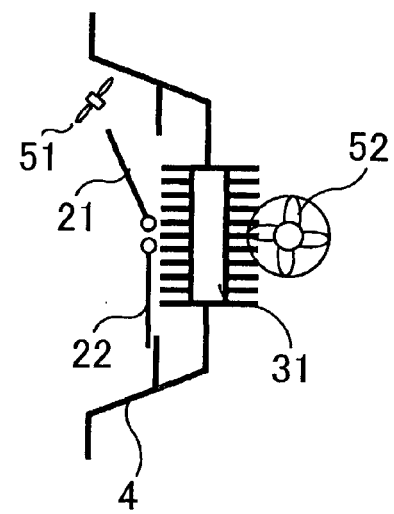
Figure 4C:
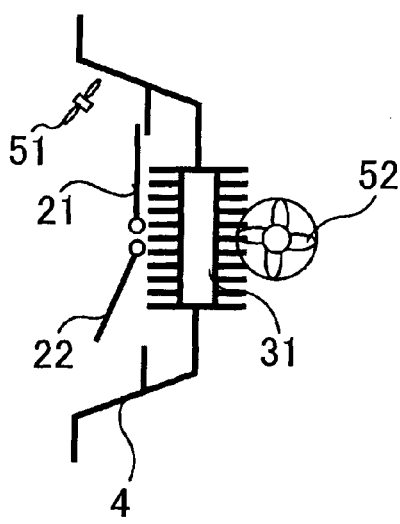
Figure 4D:
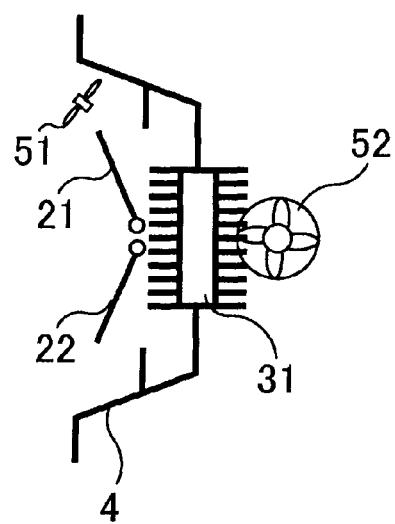

FIGS. 4A to 4D are views of open and closed patterns of the upper dividing member 21 and the lower dividing member 22. FIG. 4A is a view showing a state in which the upper dividing member 21 and the lower dividing member 22 are both closed such that the inside of the battery case 3 is divided from the inside of the temperature control unit case 4. In this embodiment, the area of the opening when each dividing member is closed is allowed to be up to one-tenth the area of the opening when the dividing member is open. That is, the area of the opening when each dividing member is closed may be one-tenth or less than the area of the opening when the dividing member is open. FIG. 4B is a view showing a state in which the upper dividing member 21 is open, i.e., a state in which the upper portion of the air chamber 5 is open. FIG. 4C is a view showing a state in which the lower dividing member 22 is open, i.e., a state in which the lower portion of the air chamber 5 is open. FIG. 4D is a view showing a state in which the upper dividing member 21 and the lower dividing member 22 are both open, i.e., a state in which the inside of the battery case 3 communicates with the inside of the temperature control unit case 4 (i.e., the air chamber 5). This opening/closing control is performed according to a signal from the controller 10.

FIGS. 5A to 5D and 6A to 6D are views of specific examples regarding insulation/heat exchange control. FIGS. 5A to 5D show examples regarding insulation/heat exchange control when a supply of electric power is available, such as when the vehicle is running.

When the ambient air temperature is high, such as in summer as in the above example or when the vehicle is in a high-temperature region, the air temperature of internal space formed by the battery case 3 and the temperature control unit case 4 (hereinafter this space may be referred to as the "inside the case") follows the ambient air temperature and also becomes high. When the temperature inside the case (i.e., the case internal temperature) is high (20° C. or higher in this example) and the temperature of the outside air is higher than the temperature inside the case, the upper dividing member 21 and the lower dividing member 22 are both controlled such that the temperature inside the case will not rise further (i.e., such that it can be kept cool). That is, the upper dividing member 21 and the lower dividing member 22 are both controlled to be closed such that the inside of the case is insulated from the outside air (this state may also be referred to as an "insulated state") (see FIG. 5A). As a result, the air chamber 5 becomes an insulating layer of air. Thus, although heat exchange is performed between the outside air and the air chamber 5 via the heat exchange fin unit 31, the inside of the battery case 3 is insulated from the air chamber 5. Also, in order to keep the inside of the case insulated from the outside air, the external fan 52 that promotes heat exchange is preferably stopped. On the other hand, the internal circulating fan 51 is driven to inhibit temperature variation inside the case.

Also, when the temperature inside the case is high and the outside air temperature is lower than the air temperature inside the case, the upper dividing member 21 and the lower dividing member 22 are both controlled to be open such that the inside of the case is actively cooled (see FIG. 5B). In order to actively perform heat exchange between the outside air and the inside of the case, the internal circulating fan 51 and the external fan 52 are both driven. In this case, the internal circulating fan 51 is operated so that it blows air downward (i.e., in the direction of the arrow shown in FIG. 5B) to effectively bring cool air into the battery case 3. This is done to direct the low-temperature air downward and bring cooling air into the battery case 3 even faster, because high-temperature air and low-temperature air have different air densities due to the temperature difference, and consequently high-temperature air rises and low-temperature air falls.

On the other hand, when the ambient air temperature is low, such as in winter as in the above example or when the vehicle is in a low-temperature region, the temperature inside the case follows the ambient air temperature and also becomes low.

When the temperature inside the case (the case internal temperature) is low (5° C. or lower in this example) and the temperature of the outside air is lower than the temperature inside the case, the upper dividing member 21 and the lower dividing member 22 are both controlled such that the inside of the case will not be further cooled (i.e., will be kept warm). That is, the upper dividing member 21 and the lower dividing member 22 are both controlled to be closed, i.e., to the insulated state (see FIG. 5C). Also, the external fan 52 is stopped to maintain insulation, and the internal circulating fan 51 is driven to suppress temperature variation inside the case.

Also, when the temperature inside the case is low and the outside air temperature is higher than the air temperature inside the case, the upper dividing member 21 and the lower dividing member 22 are both controlled to be open such that the inside of the case is actively heated (see FIG. 5D). In order to promote heat exchange between the outside air and the inside of the case, the internal circulating fan 51 and the external fan 52 are both driven. In this case, the internal circulating fan 51 is operated so that air flows upward (i.e., in the direction of the arrow shown in FIG. 5D) to direct the high-temperature air upward and bring warm air into the battery case 3 faster.

FIGS. 6A to 6D are views of examples of states of the upper dividing member 21 and the lower dividing member 22 when the engine of the vehicle is off and the vehicle is left. In this case, in principle no electric power is supplied, so the controller 10 performs control to establish one of the states shown in FIGS. 6A to 6D immediately before the supply of electric power is stopped due to the engine stopping. Also, the internal circulating fan 51 and the external fan 52 are not driven because electric power is not supplied (the internal circulating fan 51 and the external fan 52 are not shown in FIGS. 6A to 6D).

When the ambient air temperature is high, such as in summer as in the above example or when the vehicle is in a high-temperature region, the upper dividing member 21 and the lower dividing member 22 are placed in open and closed states to reduce the flow of warm air into the battery case 3 and promote the flow of cool air into the battery case 3. To achieve this, the controller 10 performs control such that the upper dividing member 21 is closed and the lower dividing member 22 is open before the supply of electric power is stopped (see FIGS. 6A and 6B). When the temperature inside the case is lower than the outside air temperature, the upper side is closed, so the warm air that was originally outside air is retained in the upper portion of the air chamber 5 due to the difference in the air density, as shown in FIG. 6A. As a result, when the ambient air temperature is high, the inflow of warm air into the battery case 3 is reduced, so the inside of the battery case 3 is kept cool. On the other hand, when the ambient air temperature is high and the temperature inside the case is higher than the outside air temperature, the cool air that was originally outside air flows downward due to the difference in the air density, and flows into the battery case 3 because the lower side is open, as shown in FIG. 6B. As a result, in a high-temperature environment, cool air is directed into the battery case 3, thereby enabling the air inside the battery case 3 to be cooled.

Also, when the ambient air temperature is low, such as in winter as in the above example or when the vehicle is in a low-temperature region, the upper dividing member 21 and the lower dividing member 22 are placed in open and closed states to promote the flow of warm air into the battery case 3 and reduce the flow of cool air into the battery case 3. To achieve this, the controller 10 performs control such that the upper dividing member 21 is open and the lower dividing member 22 is closed before the supply of electric power is stopped (see FIGS. 6C and 6D). When the temperature inside the case is higher than the outside air temperature, the lower side is closed, so the cool air that was originally outside air is retained in the lower portion of the air chamber 5 due to the difference in the air density, as shown in FIG. 6C. As a result, in a low-temperature environment, the inflow of cool air into the battery case 3 is reduced, so the inside of the battery case 3 is kept warm. On the other hand, when the ambient air temperature is low and the temperature inside the case is lower than the outside air temperature, the warm air that was originally outside air flows into the battery case 3 because the upper side is open, as shown in FIG. 6D. As a result, when the ambient air temperature is low, warm air that was originally outside air is directed into the battery case 3, thereby enabling the air inside the battery case 3 to be heated.

Figure 7A:
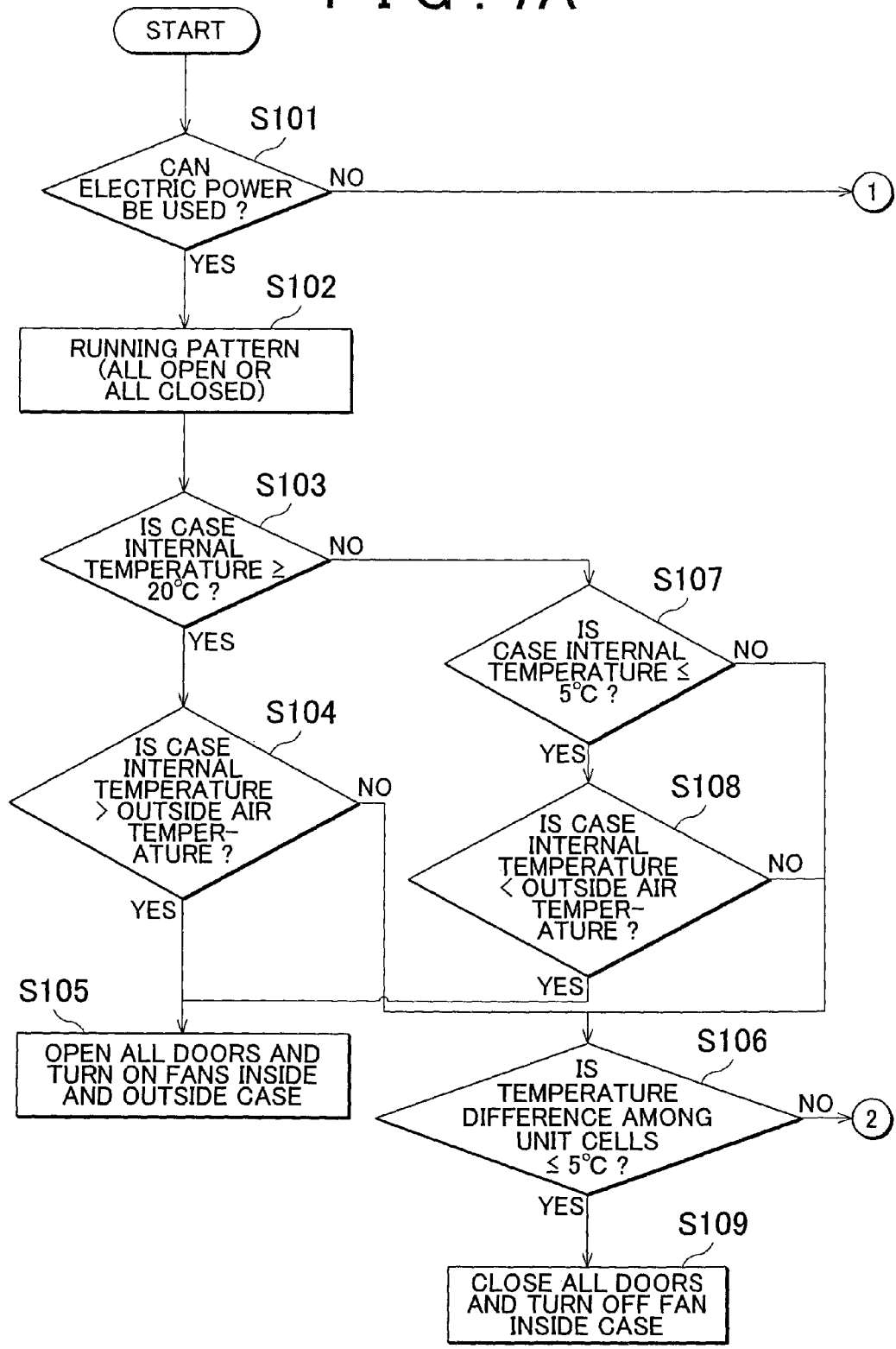
FIGS. 7A and 7B show a flowchart illustrating one example of control of the power storage device cooling system according to this embodiment.
Figure 7B:
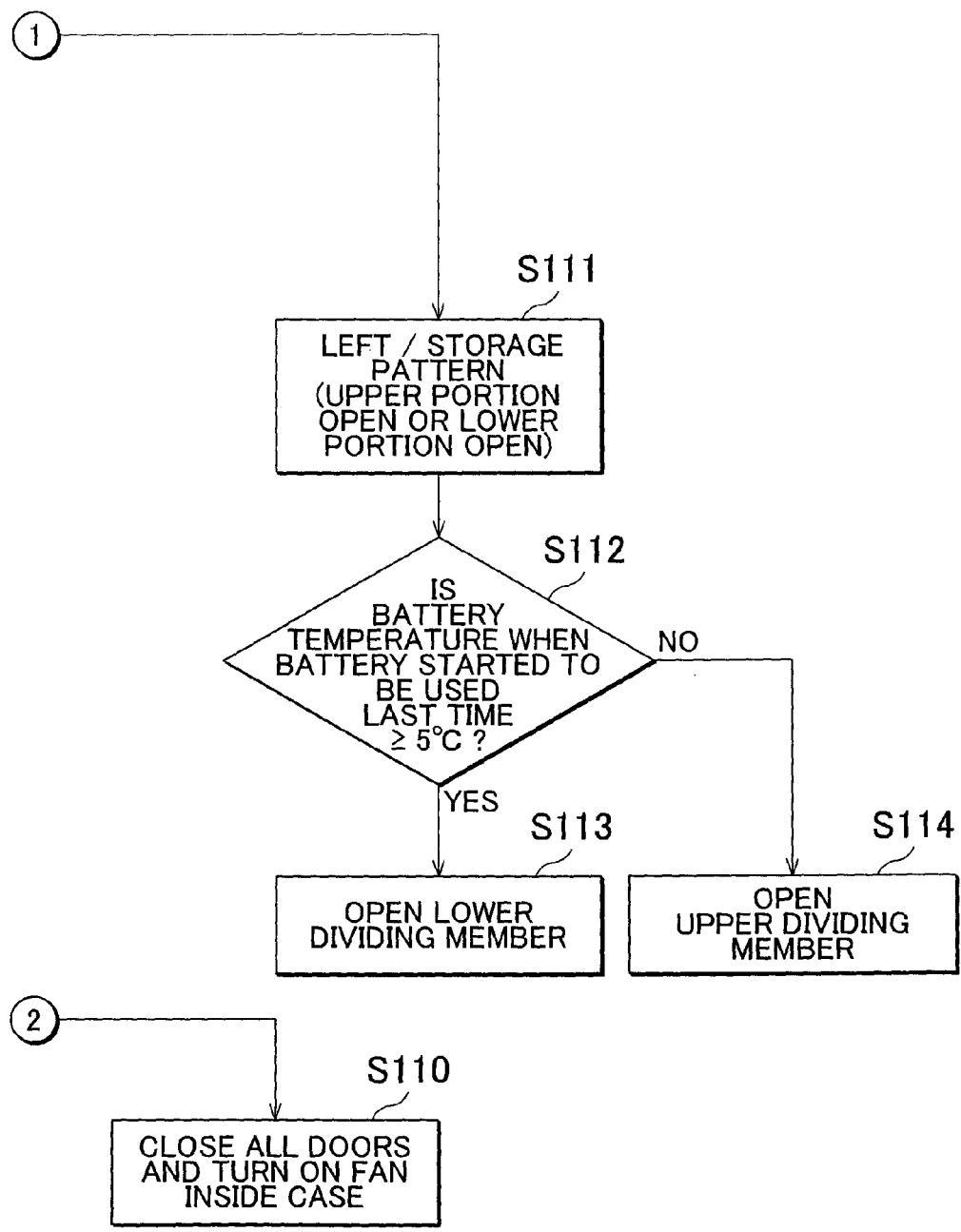

Next, the control of the controller 10 will be described with reference to the flowchart in FIGS. 7A and 7B.

The controller 10 first determines whether electric power is able to be used (i.e., a supply of electric power is available) (step S101). This determination is made based on a determination of the ON/OFF state of an ignition switch, and a determination as to whether the ignition switch has been switched from ON to OFF.

If electric power is able to be used (i.e., the supply of electric power is available) (i.e., Yes in step S101), the controller 10 switches to a running pattern, i.e., switches the mode so that the upper dividing member 21 and the lower dividing member 22 will either be both open or both closed (step S102).

The controller 10 then obtains temperature information from the case internal temperature sensor 71 and determines whether the temperature inside the case is equal to or greater than 20° C. (step S103). If the temperature is equal to or greater than 20° C. (i.e., Yes in step S103), the controller 10 obtains temperature information from the outside air temperature sensor 73 and compares the outside air temperature with the case internal temperature obtained in step S103 (step S104). If the case internal temperature is higher than the outside air temperature (i.e., Yes in step S104), the controller 10 performs control such that both the upper dividing member 21 and the lower dividing member 22 are open and drives both the internal circulating fan 51 and the external fan 52 (step S105). In step S105, the state shown in FIG. 5B is established.

If in step S104 the case internal temperature is equal to or lower than the outside air temperature (i.e., No in step S104), the controller 10 then obtains the temperature information on the unit cells 2 from the battery temperature sensor 72, calculates a temperature difference among the unit cells 2, and determines if this temperature difference is equal to or less than 5° C. (step S106). If the temperature difference among the unit cells 2 is equal to or less than 5° C. (i.e., Yes in step S106), the controller 10 performs control such that both the upper dividing member 21 and the lower dividing member 22 are closed, and turns off the internal circulating fan 51 because the temperature variation among the unit cells 2 is within the allowable range (step S109). However, if the temperature difference among the unit cells 2 exceeds 5° C. (i.e., No in step S106), the controller 10 performs control such that both the upper dividing member 21 and the lower dividing member 22 are closed, and turns on the internal circulating fan 51 because the temperature variation among the unit cells 2 is outside the allowable range (step S110). In step S110, the state shown in FIG. 5A is established.

Returning now to the determination in step S103, if in step S103 the temperature is less than 20° C. (i.e., No in step S103), the controller 10 determines whether the case internal temperature obtained in step S103 is equal to or less than 5° C. (step S107). If the case internal temperature is equal to or less than 5° C. (i.e., Yes in step S107), the controller 10 obtains the temperature information from the outside air temperature sensor 73 and compares the outside air temperature with the case internal temperature obtained in step S103 (step S108). If the case internal temperature is lower than the outside air temperature (i.e., Yes in step S108), the process proceeds on to step S105. At this time, the state shown in FIG. 5D is established.

If in step S107 the case internal temperature exceeds 5° C. (i.e., No in step S107), or if in step S108 the case internal temperature is equal to or greater than the outside air temperature (i.e., No in step S108), the process proceeds on to step S106. In step S110 in this case, the upper dividing member 21 and the lower dividing member 22 are in the states shown in FIG. 5C.

Returning now to the determination in step S101, if in step S101 it is determined that there will be a shift from a state in which electric power is able to be used to a state in which electric power is not able to be used (i.e., the supply of electric power is to become unavailable) (i.e., No in step S101), the controller 10 switches to a left/storage pattern, i.e., switches the mode such that one of the upper dividing member 21 and the lower dividing member 22 is open and the other is closed (step S111).

The controller 10 obtains information on the temperature at the time when the battery started to be used the last time, the information being stored in a storage device (not shown), and determines whether this temperature information is equal to or higher than 5° C. (step S102). In this example, the temperature information on the past, i.e., the information on the temperature when the battery was used the last time, is obtained and compared to a threshold value, but the controller 10 may also obtain temperature information in real time from the outside air temperature sensor 73 and compare it to the threshold value. If the obtained temperature is equal to or higher than 5° C. (i.e., Yes in step S112), the controller 10 performs control such that the upper dividing member 21 is closed and the lower dividing member 22 is open (S113). In step S113, the state shown in FIGS. 6A and 6B is established.

On the other hand, if in step S112 the obtained temperature is less than 5° C. (i.e., No in step S112), the controller 10 performs control such that the upper dividing member 21 is open and the lower dividing member 22 is closed (step S114). In step S114, the state shown in FIGS. 6C and 6D is established.

The threshold values (i.e., 5° C. and 20° C.) for the determinations described above are set values that are stored in advance in a storage device (not shown), and may be changed.

When the power storage device 1 is removed from the vehicle and stored for a long term or before the power storage device 1 is shipped, the upper dividing member 21 is controlled to be closed and the lower dividing member 22 is controlled to be open as shown in FIG. 1B. That is, the upper dividing member 21 and the lower dividing member 22 are placed in open/closed states in which priority is given to keeping the inside of the battery case 3 cool or cooling the inside of the battery case 3. This is because when the power storage device 1 is stored for a long term, it is preferable to give priority to reducing deterioration due to heat than reducing a decrease in output of the battery. Also, in the power storage device 1, the manually controllable switch 6 to close the upper dividing member 21 and open the lower dividing member 22 is provided on an upper portion of the outside wall of the temperature control unit case 4. The upper dividing member 21 and the lower dividing member 22 are operated by manually operating this switch 6. The reason for positioning the switch 6 on the upper portion of the outside wall of the temperature control unit case 4 is that, when an operator puts the power storage device 1 down, he or she is able to arrange the power storage device 1 right side up. By recognizing in advance that the switch is facing up and checking the orientation of the switch when arranging the power storage device 1, the operator is able to arrange the power storage device 1 so that it faces in the same up-down direction.

Figure 8:
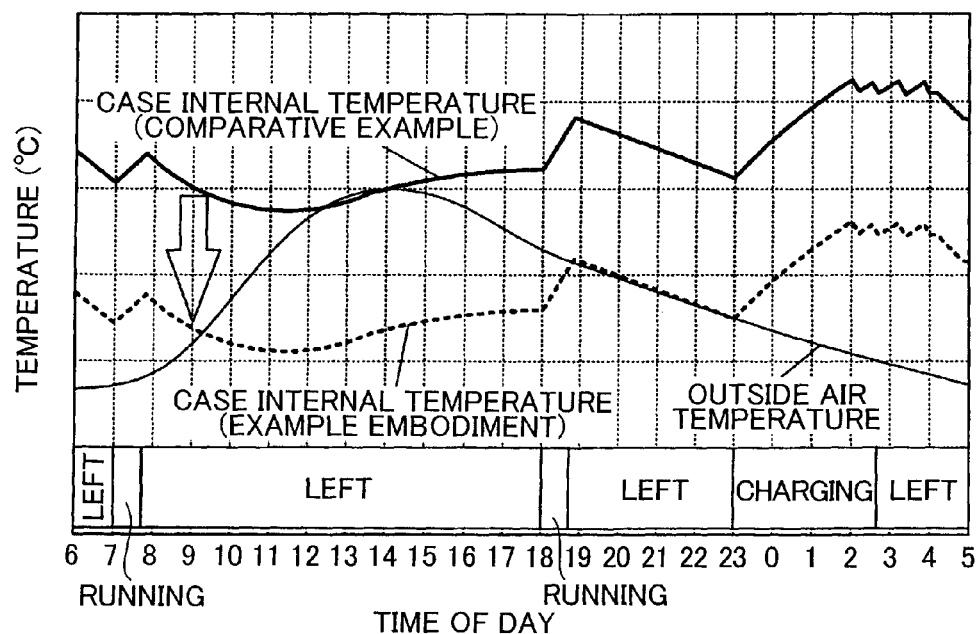
FIG. 8 is a graph showing one example of a cooling effect of the embodiment.

Next, the effect of the embodiment will be described in detail. FIG. 8 is a graph showing a change in temperature over time in a case internal temperature of a comparative example, and a change in temperature over time in the case internal temperature of an example embodiment. Also, the data shown in FIG. 8 was obtained in a high-temperature environment during summer, and is an example that verifies the cooling and keeping cool effects.

In the comparative example, a battery pack in which a battery case is formed by only galvanized steel sheet is mounted in a plug-in hybrid vehicle, and the change in temperature of the case over time was measured. Also, in this example embodiment, the power storage device cooling system 100 described above was mounted in the plug-in hybrid vehicle and the change in temperature over time was measured.

In FIG. 8, the term "LEFT" refers to the period of time for which the plug-in hybrid vehicle was stopped with the ignition switch of the vehicle off. Therefore, during the period of time of LEFT, the internal circulating fan 51 and the external fan 52 shown in FIGS. 1A and 1B are stopped. The term "RUNNING" refers to the period of time for which the plug-in hybrid vehicle is actually running. The term "CHARGING" refers to the period of time for which the plug-in hybrid vehicle is charging by a connector of a charging cable that extends from an external power supply being connected. In order to compare the test results on the same basis, the temperature was measured in the example embodiment and the comparative example on the same day and at the same location.

As is also clear from FIG. 8, it is evident that by providing the power storage device cooling system 100, it is possible to reduce a rise in the temperature inside the case as compared to the comparative example. That is, according to the example embodiment, it is possible to effectively reduce a rise in the temperature of the battery in particular.

Figure 9:
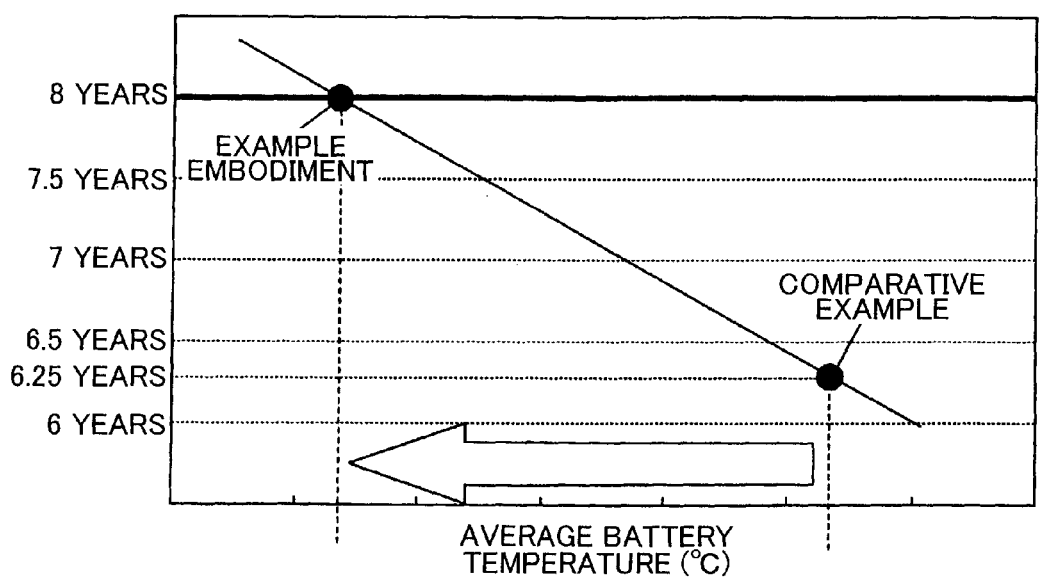
FIG. 9 is a graph showing an example in which the battery life increases when the embodiment is applied.

A difference in battery pack life between the battery pack of the comparative example and the battery pack of this example embodiment will be described with reference to FIG. 9. In the comparative example, the average battery temperature is high so the battery life is estimated to be approximately 6.25 years. However, with the example embodiment, the average battery temperature is relatively low so the battery life is approximately 8 years (an estimated value). These results verify the effect.

EXAMPLE 1

Figure 10A:
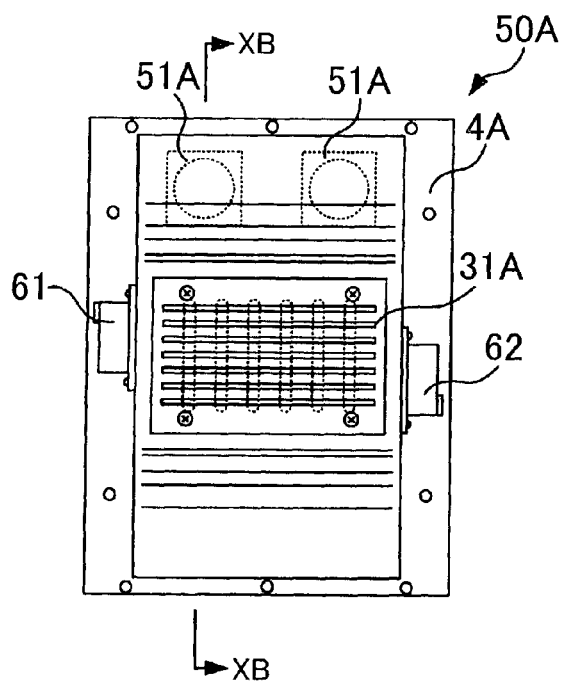
FIGS. 10A to 10C are views of the structure of Example 1.
Figure 10B:
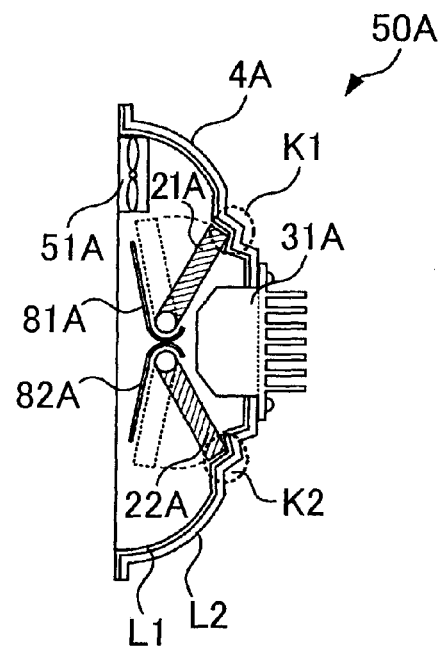

FIG. 10A is a plan view of a temperature control unit 50A of Example 1, and FIG. 10B is a sectional view taken along line XB-XB in FIG. 10A. A temperature control unit case 4A is formed by two layers, i.e., an inside layer that is a resin layer L1 and an outside layer that is an insulating layer L2 (the material is foam PP). Also, the sectional shapes of the upper and lower portions of the temperature control unit case 4A shown in FIG. 10B are arc shapes with no corner portions where airflow would tend to become stagnant. Also, the temperature control unit case 4A has bent portions K1 and K2 for receiving an end portion of an upper dividing member 21A and an end portion of a lower dividing member 22A when the upper dividing member 21A and the lower dividing member 22A are closed. The stopping positions when the upper dividing member 21A and the lower dividing member 22A are closed are fixed by these bent portions K1 and K2. Also, stopper members 81A and 82A are provided to fix the stopping positions when the upper dividing member 21A and the lower dividing member 22A are open. Operation of the upper dividing member 21A is controlled by a servo motor 61, and operation of the lower dividing member 22A is controlled by a servo motor 62.

Also, a circulating fan is not provided inside a battery case of an existing power storage device, so in Example 1, an internal circulating fan 51A is provided in the temperature control unit 50A.

Figure 10C:
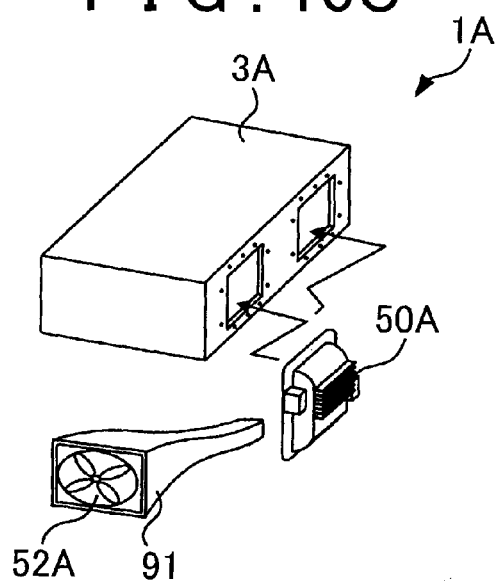

The temperature control unit 50A is attached in two locations to the side surface of a battery case 3A, as shown in FIG. 10C. Also, the temperature of outside air near the power storage device 1A is likely to be high due to heat generated by the power storage device 1A and other equipment. Therefore, in Example 1, outside air near the power storage device 1A is not taken in. Instead, air outside the vehicle is directly introduced using an air introducing duct 91 with one opening facing the temperature control unit 50A and the other opening facing outside of the vehicle, by driving an external fan 52A.

EXAMPLE 2

Figure 11A:
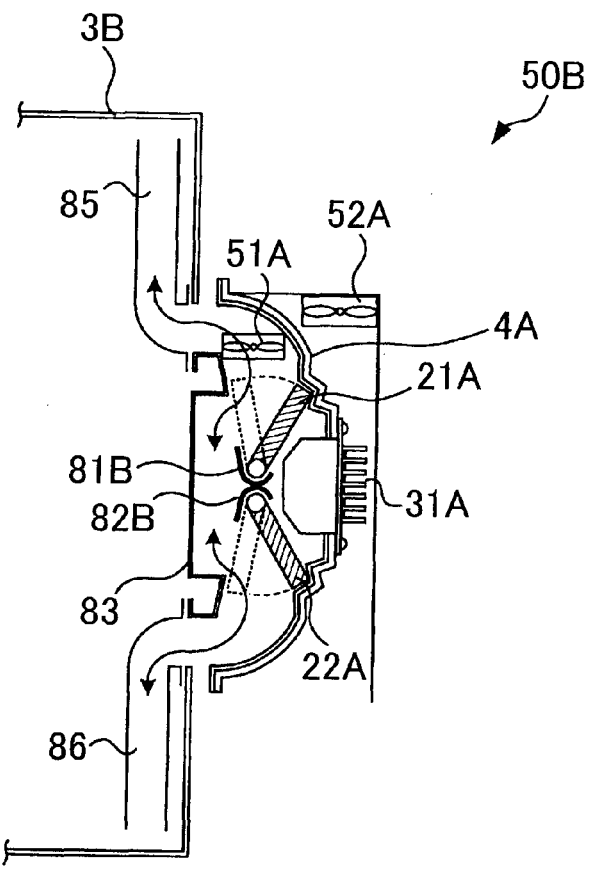
FIGS. 11A and 11B are views of the structure of Example 2.
Figure 11B:
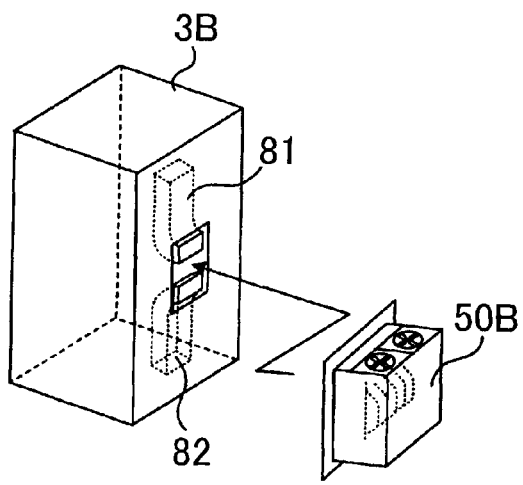

FIGS. 11A and 11B are views illustrating a case in which a temperature control unit 50B is attached to a battery case 3B that is longer in the height direction than the temperature control unit 50B, with FIG. 11A being a sectional view of the battery case 3B and the temperature control unit 50B, and FIG. 11B being a perspective view when attaching the temperature control unit 50B to the battery case 3B. The battery case 3B includes a duct 85 through which air flows between an upper inside portion of the battery case 3B and an upper inside portion of the temperature control unit 50B, and a duct 86 through which air flows between a lower inside portion of the temperature control unit 50B and a lower inside portion of the battery case 3B. Cool air and warm air that has undergone heat exchange by a heat exchange fin unit 31A is circulated through the entire battery case 3B by these ducts 85 and 86.

Further, the stopper members 81A and 82A in Example 1 are long in the height direction, so when the stopper members 81A and 82A in Example 1 are used, the circulating flow by the internal circulating fan 51A may be interrupted by the stopper members 81A and 82A (see FIG. 10B). Stopper members 81B and 82B in Example 2 are shorter than the stopper members in Example 1 in the height direction, so interruption of the circulating flow is reduced. Also, in Example 2, a plate 83 is provided between the battery case 3B and the temperature control unit 50B such that a constant flow path is ensured when the upper dividing member 21A and the lower dividing member 22A are closed.

In the embodiment, an example is described in which two dividing members that are opened and closed, i.e., the upper dividing member and the lower dividing member, are used, but the number of dividing members is not limited as long as at least two dividing members are arranged in the up-down direction.

As described in detail above, with the embodiment, the temperature inside of a power storage device is regulated. Moreover, the temperature inside a power storage device is regulated using the difference in air density that occurs due to a difference in air temperature, even if a supply of electric power is unavailable.

The invention claimed is:

1. A power storage device comprising:
a case in which at least one unit cell is housed;
a heat exchanger that is provided in a wall surface of the case so as to face both an inside of the case and an outside of the case, and that performs heat exchange between the inside of the case and the outside of the case; and
at least two dividing members that are arranged in an up-down direction inside the case so as to be opened and closed independently of one another, and that divide a space inside the case into a space in which the at least one unit cell is housed and a space in which the heat exchanger is arranged;
wherein the at least two dividing members include an upper dividing member that is arranged at an uppermost position among the at least two dividing members and pivots about a lower end portion serving as a fulcrum, and a lower dividing member that is arranged at a lowermost position among the at least two dividing members and pivots about an upper end portion serving as a fulcrum;
wherein the at least two dividing members include an upper dividing member that is arranged at an uppermost position among the at least two dividing members and pivots about a lower end portion serving as a fulcrum, and a lower dividing member that is arranged at a lowermost position among the at least two dividing members and pivots about an upper end portion serving as a fulcrum.

2. The power storage device according to claim 1, wherein each of the at least two dividing members is parallel to the up-down direction when the at least two dividing members are closed such that the space inside the case is divided into the space in which the at least one unit cell is housed and the space in which the heat exchanger is arranged.

3. The power storage device according to claim 1, further comprising a fan that is positioned in the space in which the at least one unit cell is housed when the at least two dividing members are closed such that the space in which the at least one unit cell is housed is divided from the space in which the heat exchanger is arranged by the at least two dividing members.

4. The power storage device according to claim 1, wherein the heat exchanger is provided on a side surface of the case, and the fulcrum of the upper dividing member and the fulcrum of the lower dividing member are positioned near a center of the heat exchanger in the up-down direction.

5. The power storage device according to claim 3, further comprising an external fan that is provided outside the case and blows air toward a side of the heat exchanger, the side facing the outside of the case;
the power storage device further includes a case internal temperature sensor that measures the temperature inside the case, and an outside air temperature sensor that obtains information relating to the outside air temperature.

6. A battery temperature regulating method for a power storage device that includes a case in which at least one unit cell is housed, a heat exchanger that is provided in a wall surface of the case so as to face both an inside of the case and an outside of the case, and that performs heat exchange between the inside of the case and the outside of the case, at least two dividing members that are arranged in an up-down direction inside the case so as to be opened and closed independently of one another, and that divide a space inside the case into a space in which the at least one unit cell is housed and a space in which the heat exchanger is arranged, a driving portion that drives the at least two dividing members independently of one another, a case internal temperature sensor that measures the temperature inside the case, an outside air temperature sensor that obtains information relating to the outside air temperature, and a controller, the battery temperature regulating method comprising:
- detecting, by the outside air temperature sensor, an air temperature outside the case that is a temperature of air to which the heat exchanger is exposed;
- detecting, by the case internal temperature sensor, and air temperature inside the case; and
- performing, by the controller, drive control to pivot, by the driving portion, at least one of the at least two dividing members based on the detected air temperature outside the case and the detected air temperature inside the case, and
- the at least two dividing members include an upper dividing member that is arranged at an uppermost position among the at least two dividing members and pivots about a lower end portion serving as a fulcrum, and a lower dividing member that is arranged at a lowermost position among the at least two dividing members and pivots about an upper end portion serving as a fulcrum.

7. The battery temperature regulating method according to claim 6, wherein:
in a case where a supply of electric power to the driving portion is available, driving control is performed such that both the upper dividing member and the lower dividing member are either open or closed, and in a case where the supply of electric power to the driving portion is to become unavailable, the driving control is performed such that one of the upper dividing member and the lower diving member is open or closed before the supply of electric power to the driving portion becomes unavailable.

8. The battery temperature regulating method according to claim 7, wherein in the case where the supply of electric power to the driving portion is available, the driving control is performed such that both the upper dividing member and the lower dividing member are open if the detected air temperature inside the case is equal to or higher than a first threshold value, and higher than the detected air temperature outside the case, or if the detected air temperature inside the case is equal to or lower than a second threshold value, and lower than the detected air temperature outside the case, the second threshold value being smaller than the first threshold value.

9. The battery temperature regulating method according to claim 6, wherein:
the power storage device further includes a fan arranged inside the case; and
the battery temperature regulating method further includes driving the fan so that the fan rotates in a rotational direction that creates a downward airflow near the heat exchanger if the detected air temperature inside the case is equal to or higher than a first threshold value, and driving the fan so that the fan rotates in a rotational direction that creates an upward airflow near the heat exchanger if the detected air temperature inside the case is equal to or lower than a second threshold value that is smaller than the first threshold value.

10. The battery temperature regulating method according to claim 6, wherein:
in a case where a supply of electric power to the driving portion is to become unavailable, driving control is performed such that the upper dividing member is closed and the lower dividing member is open before the supply of electric power to the driving portion becomes unavailable if the detected air temperature outside the case is equal to or higher than a third threshold value, and the driving control is performed such that the upper dividing member is open and the lower dividing member is closed before the supply of electric power to the driving portion becomes unavailable if the detected air temperature outside the case is lower than the third threshold value.

11. A power storage device comprising:
a case in which at least one unit cell is housed;
a heat exchanger that is provided in a wall surface of the case so as to face both an inside of the case and an outside of the case, and that performs heat exchange between the inside of the case and the outside of the case; and
at least two dividing members that are arranged in an up-down direction inside the case so as to be opened and closed independently of one another, and that divide a space inside the case into a space in which the at least one unit cell is housed and a space in which the heat exchanger is arranged
wherein the at least two dividing members include an upper dividing member and a lower dividing member, and
wherein an opening formed by the upper dividing member when the upper dividing member is open is positioned higher than the heat exchanger, and an opening formed by the lower dividing member when the lower dividing member is open is positioned lower than the heat exchanger.

* * * * *